Figure 1:
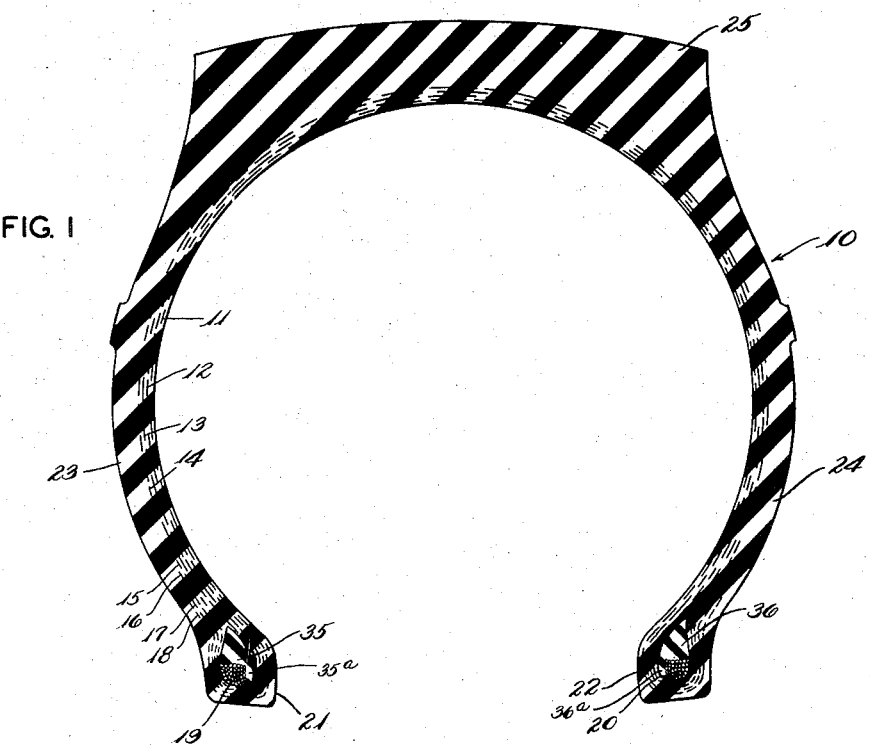

INVENTOR.
WILLIAM R. WOODALL
BY W. A. Fraser
ATTY.

United States Patent Office 2,874,747
Patented Feb. 24, 1959

2,874,747
TIRE CONSTRUCTION

William R. Woodall, Akron, Ohio, assignor to The Firestone Tire & Rubber Company, Akron, Ohio, a corporation of Ohio Application April 17, 1957, Serial No. 653,313

2 Claims. (Cl. 152—354)

This invention relates to pneumatic tires and particularly to pneumatic tire constructions providing improved ride characteristics.

In recent years, as automobiles have become quieter in operation and as the road surfaces have become smoother, many pneumatic tires have been observed to have an objectionable ride characteristic referred to as "thump." A thumping tire transmits a periodic impulse to an automobile which at certain speeds will strike a resonance in a panel or other member of the automobile and will thereby be amplified to the point where it is annoying and objectionable.

At one time it was thought that thump was due to an out-of-balance condition of a tire, but perfectly balanced tires have been found to thump. It has been thought too that the presence of irregularities in the tire construction such as heavy body ply or tread splices, or out-of-round conditions would cause thump; yet, tires, which upon inspection are of sound construction, still exhibit this defect.

The present invention has turned away from all such conventional theories of thump and has found that if the cords of an otherwise sound tire are uniformly tensioned, thump does not occur. Hence, before discussing the solution to this problem as it is embodied in the present invention, it may be well to consider the problem of cord tension and the manner in which variations in cord tension produce thump.

As a tire rolls along a pavement, the cords of the body plies of the tire pass successively through the so-called "footprint" of the tire, the footprint being the area of contact which the tire makes with the road. The cords, just before entering the footprint, are under longitudinal tension as induced by the inflationary air pressure within the tire. As the cords enter the footprint, they lose their tension, and they remain free from tension so long as they remain in the footprint. Immediately after the cords leave the footprint they assume the same tension they had before. This resumption of a condition of tension occurs with a "snap" and when the cords snap into tension they impart rapidly successive shocks to the bead of the tire which are transmitted by the tire to the vehicle itself. Such shocks are imparted uniformly to the wheel and to the vehicle if the cords are under uniform tension. However, if the cord tension in a portion of a body ply or plies is substantially different from the tension in the remainder of the cords, there will be a series of distinctly different shocks imparted to the wheel periodically as such portion enters and leaves the footprint.

Consider, for example, the effect of a portion of a body ply extending over about 10° of arc and having a tension 20% greater than the remainder of the body plies. As such a portion leaves the footprint, the cords will snap outwardly into distended position with greater force than the cords extending over the remaining 350° of arc, and the shocks imparted to the vehicle wheel by this portion will be of consequently greater force. Thus each time such a portion passes through the footprint, a disturbance will be transmitted to the vehicle, a disturbance which, when transmitted to the vehicle, manifests itself as "thump."

The present invention solves this problem of the variation in cord tension around the periphery of the tire and the attendant problem of thump, by introducing elements into the tire which act as cord-tension regulators permitting the cords having excess tension to relieve themselves of a major portion of such extra tension. Each cord will then be under approximately the same tension. As will be seen later, these regulators also have the added function of insulating the bead wires from the changes in cord tension. Preferably such tension-regulating elements comprise relatively soft, yieldable members interposed between the bead wires and the cords, which support the cords in such a manner that the highly stressed cords "bite" deeply into the members and in this fashion relieve themselves of some of the loads and tensions which they would otherwise bear while the cords which are less highly stressed bite into the members to a lesser degree and their tension is relieved to a much less extent. Such yieldable supporting members thus permit an automatic adjustment of the cord tensions in accordance with the degree of such tensions and as a result of such adjustment, the cord tensions become fairly uniform.

In the preferred form of the invention, the tension-regulating elements comprise rings of soft rubber built into each tire bead, the rings being positioned adjacent to the inextensible wires making up the cores of the tire beads and between the wires and the cords of the body plies so that the portion of the cords which are under tension have bearing contact against the sides of the rings and are insulated from direct contact with the wires. The cords, because they are under tension, tend to pull laterally inwardly upon the soft rubber rings. Those cords which are under the higher tensions will pull inwardly upon the rings to a greater extent than the cords having lesser tensions. The highly tensioned cords thus tend to be relieved of their excess tensions in a manner without detracting from the rigidity and solidity of the tire beads on the rim bead seats.

It is accordingly a general object of the invention to provide a pneumatic tire having improved ride characteristics.

A further object is to provide a pneumatic tire which is free from the objectionable ride characteristic which is termed "thump" by present-day tire engineers.

A more specific object is to provide a pneumatic tire construction in which the cords of the body plies have a limited freedom to pull laterally inwardly and shorten their lengths under tension.

A further object is to provide means whereby the shocks caused by the changes in tension in the cords of the body plies of the tire as such cords pass through the footprint of the tire are effectively cushioned before they are transmitted to the vehicle.

Another object is to provide means which will eliminate thump in a tire without adding to the difficulty or expense of manufacture and without detracting from the performance of the tire in other respects.

Figure 2:
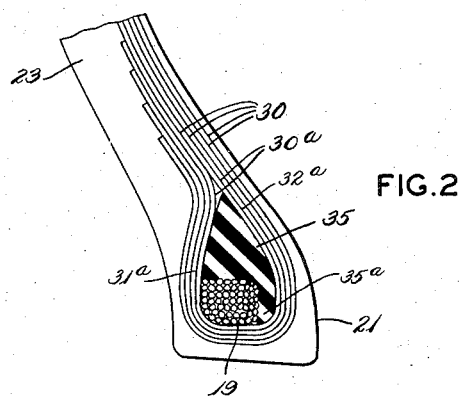

These and further objects and advantages will be apparent from the following description of the invention, reference being had to the accompanying drawing in which:

Figure 1 is a radial sectional view of a tire embodying the present invention; and Figure 2 is an enlarged fragmentary sectional view of the left bead of the tire of Figure 1, but it is somewhat diagrammatic in character to show the manner in which the tire cords contact the cushion members.

The invention is described, by way of example, in connection with an otherwise conventional pneumatic passenger tire indicated generally at 10 in the drawings. Such a tire, as shown in Figure 1, comprises a body of four plies 11, 12, 13 and 14 of rubberized, essentially weftless fabric. The edges 15—18 of the plies, respectively, are turned about and anchored to the bead wire bundles 19 and 20 which form the inextensible portions of the tire beads 21 and 22. The tire is completed by the sidewalls 23 and 24 and by the tread 25.

In order to lend stability to the tire, the warp cords 30 of the body plies extend at an angle of about 54° to the axis of the tire and the cords of each ply extend at opposite angles to the cords of adjacent plies. Although in the present example, four body plies are shown, it is to be understood that the invention can be used with equal advantage in tires having any suitable number of plies. Also, in the present example, the individual twisted cords making up the body plies are of rayon and have a 1650/2 construction, but the invention can be applied equally well in tires having cords of other material such as cotton or the other synthetic fibers such as nylon, Dacron and the like. The invention is likewise as useful with monofilaments as with twisted cords and also with metal wires and cables.

The position and function of the individual cords in the body plies of the tire is best shown in Figure 2 which is a somewhat diagrammatic section of the left bead of the tire.

For example, a cord 30a of the fourth ply 14 extends from bead to bead of the tire with its free ends 31a wrapped about the wire bundle 19 and 20.

When the tire is inflated, the tire will expand until the force of the inflationary air is balanced by the sum of the tensions in the cords of the body plies, since the rubber portions of the tire do not serve to resist the inflationary pressures to an appreciable extent. Cord 30a is therefore under a tension load of about 2–3 pounds and as a result it strives to shorten its length and relieve itself of such tension.

In a conventional tire construction it is not possible for cord 30a to shorten its length appreciably because it is buttressed in the tire by the supporting rubber and in the bead areas by the fabric reinforces which normally enclose the wire bundles of the beads. Cord 30a in the usual tire construction is thus placed in an unyielding environment so that it cannot change its length and its tension is maintained so long as the tire is inflated.

According to the present invention, however, provision is made to enable the cord 30a to shorten its length by an amount approximately proportional to the tension originally imposed upon it. This is done by providing rings 35 and 36 of relatively soft rubber which are positioned adjacent to and just inwardly of the bead wires 19 and 20. It will be noted that the usual fabric reinforce which ordinarily encloses the wires of a bead is omitted from each bead and that the rubber rings 35 and 36 are in direct contact with the wire bundles. The hardness of the rubber rings is preferably in the range of about 40 durometer but it may vary to some extent so long as it is not so soft as to be mushy and so long as it is not too hard to cushion the cords effectively. Preferably the rings 35 and 36 are partially or fully cured before they are built into the tire so that they can withstand the molding pressures without distorting and flowing away from their correct positions relative to the bead wires when the tire is vulcanized.

In the present example, the portions 35a and 36a of the rings which cover the inside surfaces of the wire bundles in the vulcanized tire are about $\frac{1}{10}$ inch thick and, as a result, when the cord 30a is wrapped about the bead wires, the portion of the cord which is under tension has direct contact with the rings. When the tire is inflated and cord 30a is placed under tension, it will tend to pull laterally toward the rings and to embed itself in the sides of the rings, see Figure 2.

What is true of cord 30a is likewise true of all the other cords of the body ply 14. Each cord will pull inwardly against the resilient rings 35 and 36. The cords which are under the greatest tensions will pull inwardly more deeply into the resilient rings than the cords having lesser tension, and the cords which tend originally to be under the greatest tensions will shorten their effective lengths. Thus shortly after the tire is first inflated, the rubber rings will have enabled the cords to equalize their tensions.

It will be observed that the bead tie-in, i. e. the manner in which the plies are wrapped about the bead wires, of the tire of Figures 1 and 2 is not conventional, but that all four plies are turned together outwardly about the bead bundles 19 and 20. This insures that those portions of the cords which are under tension and which are subject to the changes in tension as the tire passes through the footprint will be insulated from direct contact with the bead wires. Thus, the stressed portion 32a of the fourth ply 14 which extends in the body from bead to bead has contact with the bead wires only through the insulating rings 35 and 36, while the end portions of ply 14 which are wrapped about and snubbed around the bead wires and which are not subject to the changes in tension are in more direct contact with the bead wires. The stressed portions of the successively inner plies 13, 12 and 11 are likewise insulated from the bead wires by the resilient rings 35 and 36 and also by such plies as are interposed between them and the rubber rings. This construction provides the maximum cushioning of the bead wires of the tire from the changes in cord tension during the operation of the tire and as a result, the tire is relatively smooth and silent in operation.

The cords which comprise the inner plies 11, 12 and 13 not only do not have direct contact with the rubber rings 35 and 36 but will also shorten their lengths because the underlying plies will tend to yield under pressure and move inwardly upon the rubber rings. It has further been observed that the cords of the inner plies which do not have direct contact with the bead wires are not as effective in producing thump as the cords which, except for the present invention, would have direct contact.

As a result of such tension-equalizing rings, the cords of the tire will impart shocks of equal amplitude to the vehicle as they pass through the footprint. Moreover, the transmission of such shocks to the bead wires will tend to be minimized by the insulating function of the rings.

Experiments have shown that tires having these features of construction are remarkably free from thump and are quieter in operation than tires of conventional construction. The tension-regulating and shock-insulating elements do not introduce any appreciable difficulty in tire manufacture or in the performance of the tire in other respects and they are remarkably effective in producing the desired results.

I claim:

1. A pneumatic tire having a body comprising a plurality of plies extending from one bead to the other bead of said tire, the strain-resisting elements of said plies being wrapped about in the same direction and being anchored to circumferentially inextensible members comprising the cores of said tire beads, respectively, and rubber cushioning members, having a hardness substantially less than the hardness of the sidewall and tread stocks of said tire, positioned in said tire beads with portions at least $\frac{1}{10}$ inch in thickness in contact with said strain-resisting elements and between said cores and said elements, whereby the portions of said plies which are under longitudinal tension are effectively cushioned from said cores and pull laterally into said cushioning member portions to shorten their effective lengths when placed under tension.

2. A pneumatic tire of claim 1 in which said rubber cushioning members have a hardness of 40 durometer.

References Cited in the file of this patent

UNITED STATES PATENTS

| | | |
|---|---|---|
| 1,482,240 | Marquette | Jan. 29, 1924 |
| 1,809,106 | Carlin | June 9, 1931 |
| 1,813,176 | Lequillon | July 7, 1931 |
| 2,752,980 | Riggs | July 3, 1956 |